J. AUSTIN.
AUTOMATIC WINDOW.
APPLICATION FILED SEPT. 10, 1907.

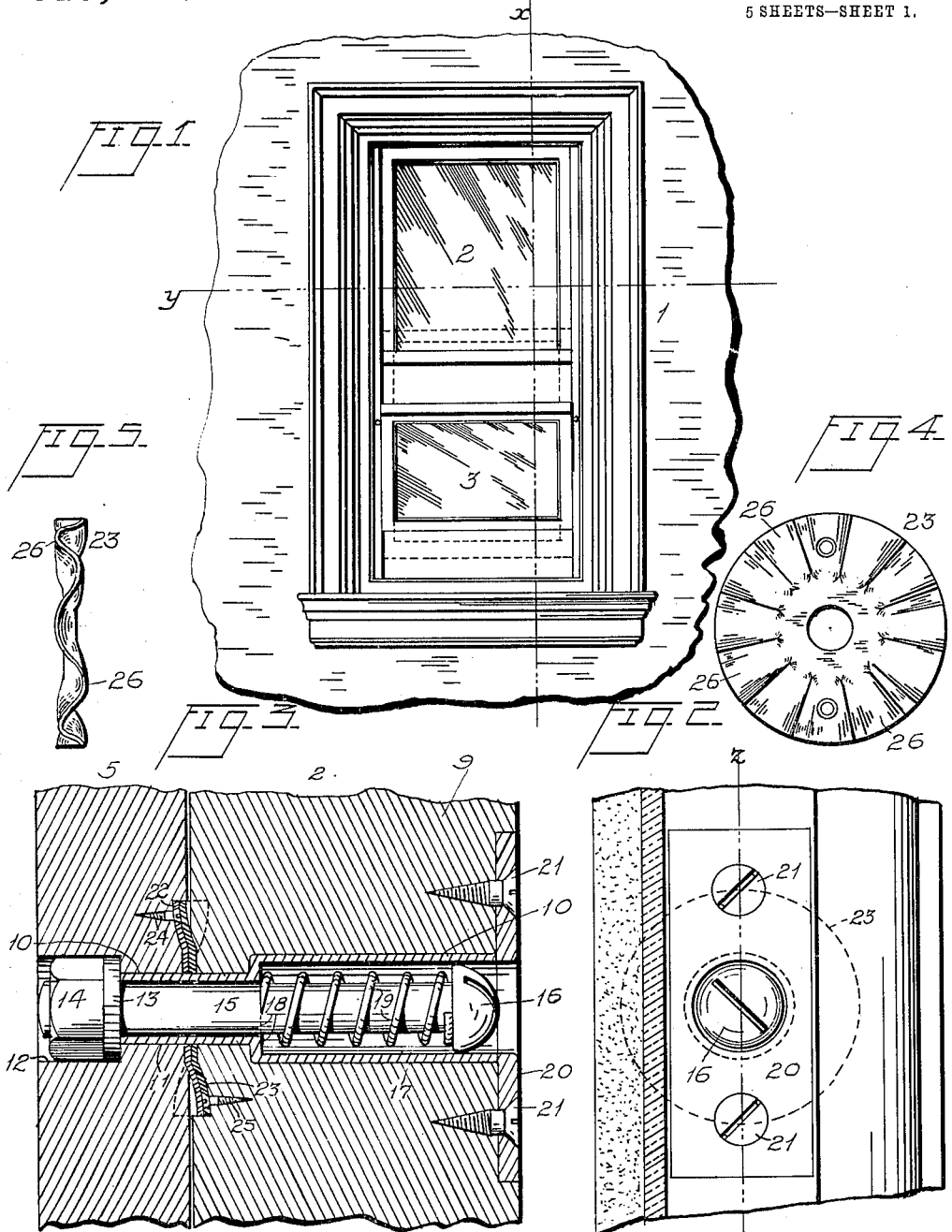

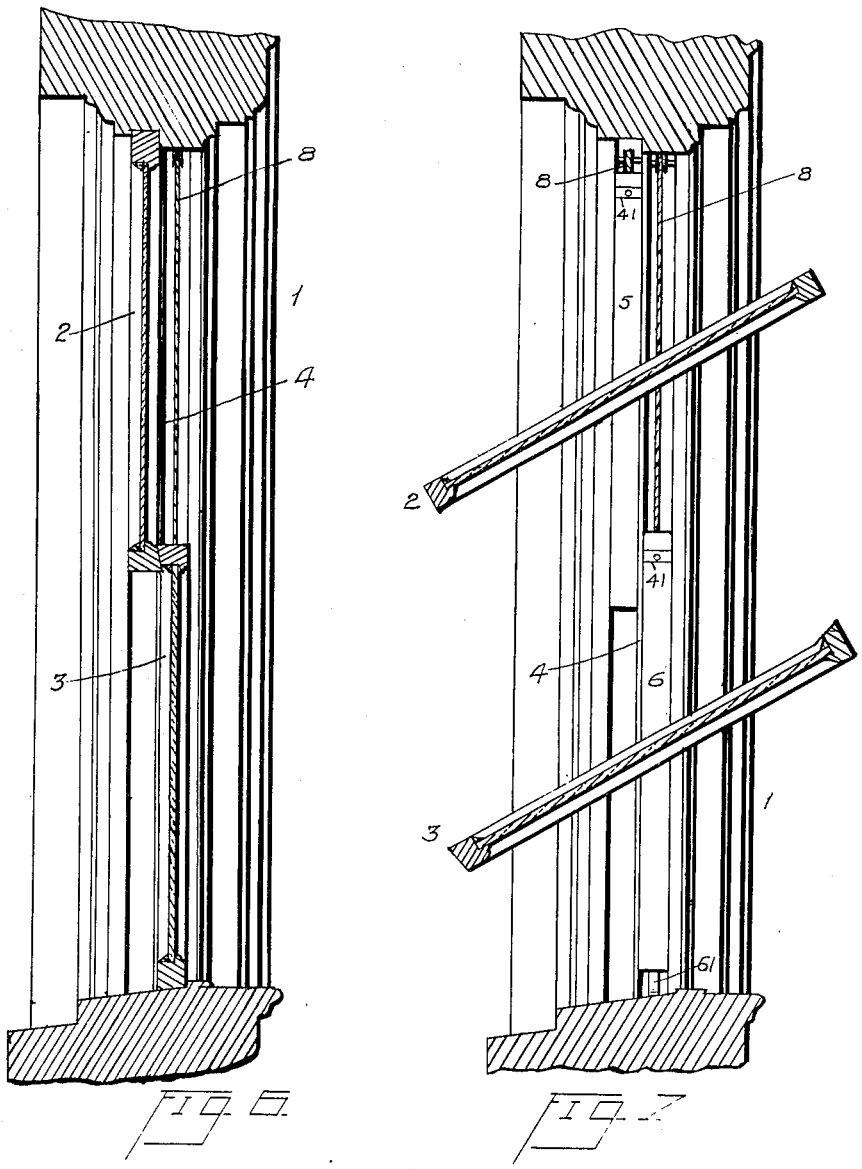

No. 919,520.

Patented Apr. 27, 1909.
5 SHEETS—SHEET 3.

WITNESSES
Frederick Germann Jr.
Ethel B. Reed

INVENTOR
John Austin
BY
Russell M. Everett,
ATTORNEY.

J. AUSTIN.
AUTOMATIC WINDOW.
APPLICATION FILED SEPT. 10, 1907.
919,520.
Patented Apr. 27, 1909.
5 SHEETS—SHEET 4
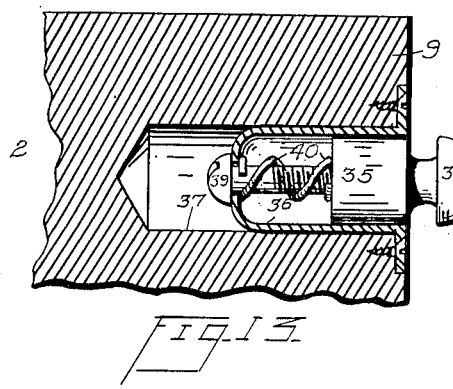
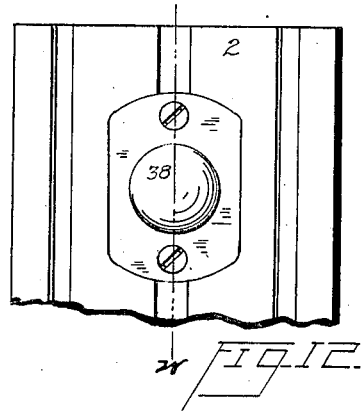
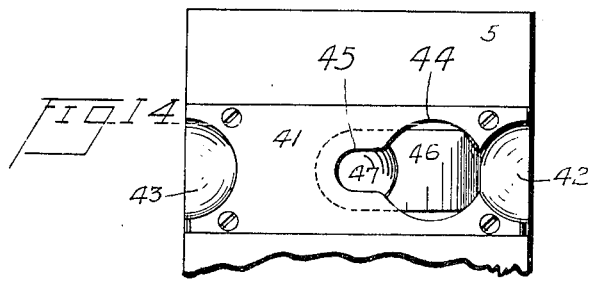
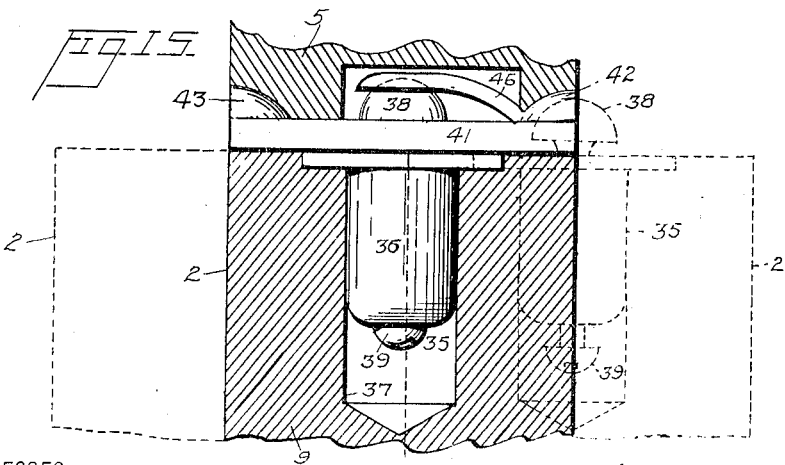
WITNESSES
Frederick Germann Jr.
Ethel B. Reed
INVENTOR
John Austin,
BY
Russell M. Everett,
ATTORNEY.

J. AUSTIN.
AUTOMATIC WINDOW.
APPLICATION FILED SEPT. 10, 1907.
919,520.
Patented Apr. 27, 1909.
5 SHEETS—SHEET 5.
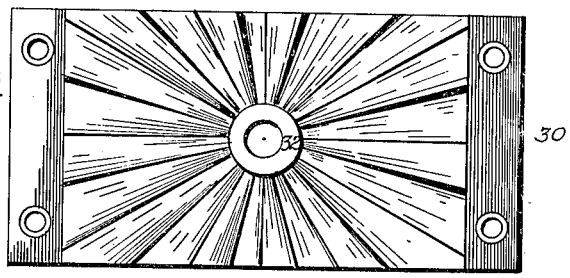
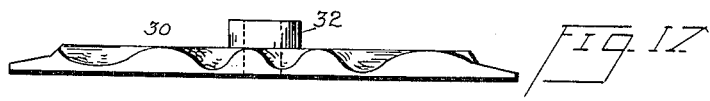
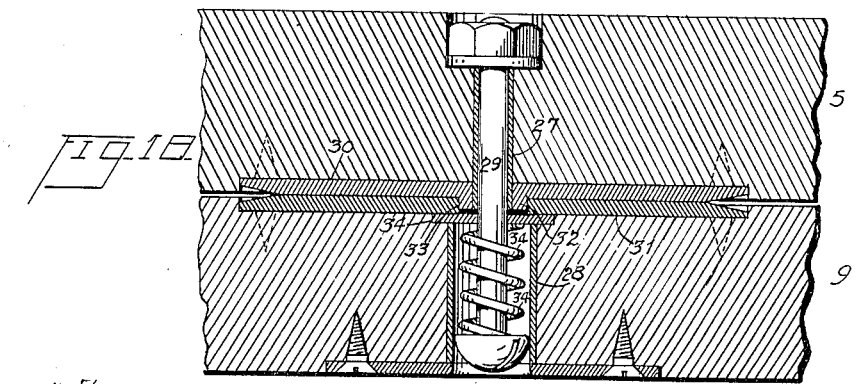
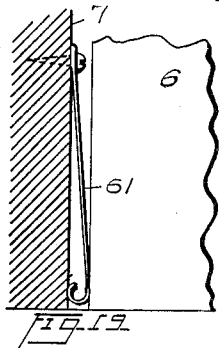
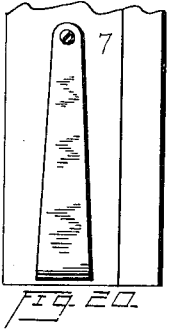
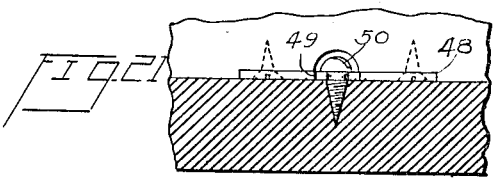
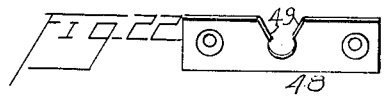
WITNESSES
Frederick Germann Jr.
Ethel B. Reed
INVENTOR
John Austin
BY
Russell M. Everett,
ATTORNEY.

UNITED STATES PATENT OFFICE.

JOHN AUSTIN, OF NEWARK, NEW JERSEY.

AUTOMATIC WINDOW.

No. 919,520.  Specification of Letters Patent.  Patented April 27, 1909.

Application filed September 10, 1907. Serial No. 392,106.

*To all whom it may concern:*

Be it known that I, JOHN AUSTIN, a citizen of the United States, residing at Newark, in the county of Essex and State of New Jersey, have invented certain new and useful Improvements in Automatic Windows, of which the following is a specification.

This invention relates to that class of windows for dwellings, offices and the like, in which the sashes while slidable vertically may also be tipped or swung upon horizontal pivots to open the window.

The objects of the invention are to secure an automatic holding of the pivoted sashes in different positions; to obtain a tight joint at the edges of the sashes when closed; to enable the sashes to be firmly held in closed position, without impeding the opening of them; to secure a simple, durable and effective construction, and one which can be readily applied without a previous special construction of the building or its windows; to thus provide a window of this class which shall be practical in use and advantageous in ventilating the room, cleaning or repairing the window and so forth, and to obtain other advantages and results as may be brought out in the following description.

Figure 8:
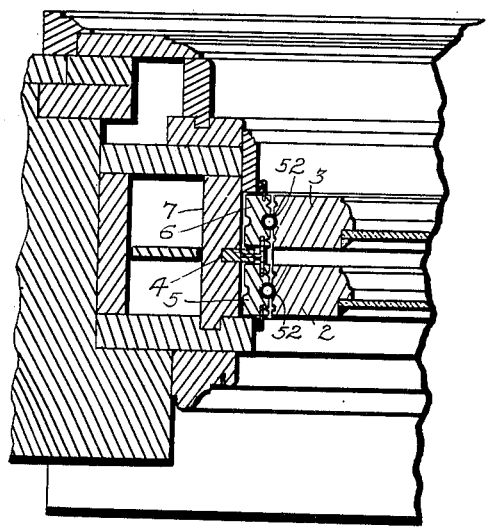
Figure 9:
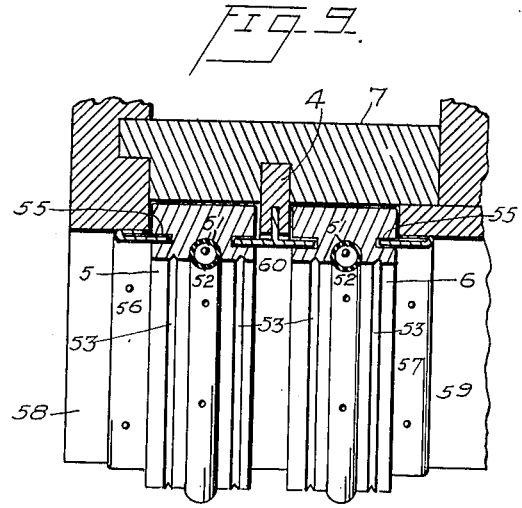
Figure 11:
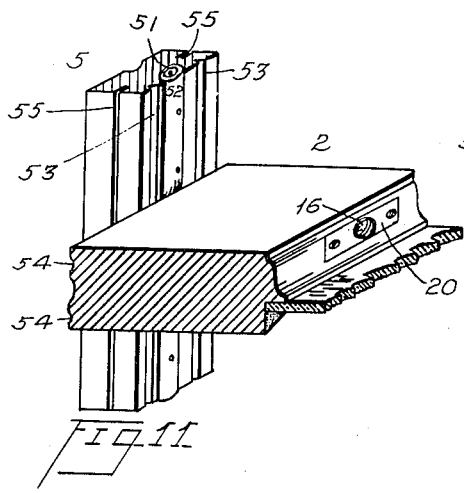
Figure 10:
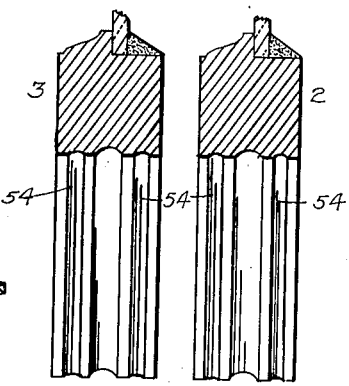

Referring to the accompanying drawings, in which like numerals of reference indicate corresponding parts in each of the several figures; Figure 1 is a view of my improved window in elevation, from the inside of the room; Fig. 2 is an edge view of a portion of the sash stile, taken on line *x* Fig. 1, and showing particularly its point of pivoting; Fig. 3 is a vertical section on line *z* Fig. 2 of a portion of the sash and one of its carrier strips, showing the connection of the two; Fig. 4 is a face view of one of the holding plates arranged between the sash and its carrier strip, and Fig. 5 is an edge view of the same; Fig. 6 is a vertical section on line *x* Fig. 1 of the entire window with its sashes closed, and Fig. 7 is a similar view showing both sashes swung into open position; Fig. 8 is a transverse section of one side portion of the window and its frame, as on line *y* Fig. 1, but showing both sashes in vertical position and the lower one raised; Fig. 9 is a view partly in section, with the pivotal sashes removed, and showing the detailed arrangement of the carrier strips with relation to the window frame on a larger scale; Fig. 10 is a correspondingly enlarged view of the edges of the sashes which are adapted to fit against the carrier strips shown in Fig. 9; Fig. 11 illustrates in detail the pivotal action of a sash with respect to its carrier strip; Fig. 12 is an outer edge view of the upper portion of a pivoted sash showing a certain catch thereon, Fig. 13 is a sectional view of the same taken on line *w* Fig. 12; Fig. 14 is a view of the upper portion of a carrier strip showing a certain keeper adapted to coöperate with the catch shown in Figs. 12 and 13; Fig. 15 is a plan view showing the said catch and its keeper edgewise and in engagement, the sash proper and its carrier strip being cut away for a clearer view and a slightly separated position of said parts being shown in dotted lines; Fig. 16 shows a modified form of holding plate for the pivotal sash and carrier strip, in face view, and Fig. 17 is an edge view of the same; Fig. 18 is a vertical central section in the plane of the window, (and corresponding to Fig. 3, above described), illustrating the said modified holding plates in the preferred method of pivoting the sash and carrier strip; Figs. 19 and 20 show in edge and face view respectively, a certain leaf spring adapted to be arranged on the pulley stile to bear against the carrier strip; Fig. 21 is a horizontal section of a portion of the lower rail of the bottom sash showing the engagement of a headed screw thereon with a slotted plate on the sill, and Fig. 22 is a detail view of said slotted plate.

In said drawings, 1 indicates a window frame of the usual detail construction, which as it forms no part of the present invention need not be further described here, but will be understood by those skilled in the art.

It is a feature of my invention that the same can be applied to previous constructions of buildings and their windows without materially altering the same, and in fact no change whatever need be made in the window frame.

2 and 3 indicate the upper and lower sashes proper of my improved window, each of which is narrower than the space between the parting beads 4, 4, and is supported at its opposite edges by carrier strips 5, 5 (or 6, 6) which lie between the edges of the sash proper and the pulley stiles 7 to slide up and down as is common in windows, the sash cords 8 being connected to these strips.

Obviously, in fitting my improvements to a window, it is necessary only to rip or plane off edge portions of the sashes and then insert the carrier strips hereinafter described. The operation is thus very easily and readily accomplished, which is one of the objects and advantages of my invention.

Each sash proper is pivoted at its opposite edges and about midway of its length, to swing out of the normal plane of the window as shown in Fig. 7 more particularly, and the manner of this pivoting is more especially illustrated in Figs. 2–5 and 11, to which reference should now be had. Both the stile 9 of the sash and its carrier strip 5 are bored clear through as at 10, and in this boring is inserted a metal sleeve 11. This sleeve terminates in the carrier strip 5 sufficiently short of its edge away from the sash to accommodate in a countersink 12 a washer 13 and nut 14 upon a bolt 15 and engaging the said end of the sleeve. Said bolt 15 lies in the sleeve 11 with its head 16 just inside the surface of the sash stile 9, and the adjacent portion of the sleeve 11 is enlarged as at 17 to provide an inner shoulder or stop 18, between which and the head of the bolt is arranged a spiral spring 19. Said sleeve and bolt thus form a pivot for the sash, and the spring 19 affords any desired tension to hold the said stile and its adjacent carrier strip close against each other. Preferably a face plate 20 secured to the edge of the stile next the glass by screws 21 holds the sleeve 11 against any possible escape.

In order to hold the sash more positively at certain points when opened, I provide upon the adjacent faces of the sash stile 9 and carrier strip 5, around the pivotal sleeve 11 and bolt 15, coöperating locking plates 22, 23. Said holding plates are annular to fit upon the sleeve 11, one being secured as by screws 24, to the carrier strip 5 and the other by screws 25 to the sash stile 9, and each plate for an annular marginal portion is transversely undulated or crimped as at 26, the crests of one plate at its exposed face normally fitting into the troughs of the other plate. To tip the window therefore it is necessary for a crest of one holding plate to pass the next crest on the other plate, and the pressure of the spring 19 before described is strong enough so that the resistance to this is greater than will be overcome except by taking hold of the sash by hand and positively swinging it. The sash proper will therefore stay in the angular position where it is left, without danger of inadvertent displacement.

A slightly modified construction of the above pivoting is illustrated in Figs. 16, 17 and 18 of the drawings, where 27 and 28 indicate separate sleeves in the carrier strip and sash stile respectively, and inclosing the bolt 29. Here the holding plates 30, 31 are cast with annular undulating surfaces upon their contacting faces, the other sides of said plates being plane. One plate, as the one 30 on the carrier strip, fits upon the sleeve 27 and has itself a collar 32 projecting into the central aperture 33 of the other plate. A washer 34 is placed against the embedded side of the plate 31 and at the end of the sleeve 28, for the spring 34 upon the bolt 29 to bear against and hold the two plates together as was first described.

To hold the sashes, or either of them, in alinement with their carrier strips, as shown in Fig. 6, so that said sashes may be slid vertically up and down as is common in windows, without any pivotal action, I prefer to place at the corners of each sash catches adapted to retain the sash and carrier strip in closed relation, as illustrated more especially in Figs. 12–15, inclusive. A plunger 35 is mounted in a casing 36 sunk in a boring 37 in the edge of the sash stile 9, having an outwardly projecting head 38 and at its inner end a screw or shank 39 projecting through the bottom of the casing, and having a spiral spring 40 on said shank between the casing and plunger to normally force the latter outward. To receive this plunger, or its head 38, a keeper plate 41 is mounted upon the carrier strip 5 as shown in Fig. 14, transversely, and this keeper is beveled at its opposite ends as at 42, 43 to allow the head 38 of the catch to pass on to it and be repressed. From the incline 42 the said head passes into an aperture 44 of the keeper plate which has a narrower extension 45 adapted to receive the neck of said head when the sash is in completely closed position, after the manner of a key-hole slot. A resilient tongue 46 pressed out of the said keeper plate lies back of the slot therein and has a socket 47 to receive the head of the bolt when its neck lies in the narrow portion 45. Although these catches just described hold the sashes in alinement with their respective carrier strips sufficiently for all ordinary purposes of using the windows as vertically sliding ones, I prefer for greater safety to employ upon the bottom rail of the lower sash means for preventing said bottom from pushing outward, if for instance a person sat down on the window sill when the window was closed but the usual fastener at the meeting rails of the two sashes not secured. These means preferably consist, as shown in Figs. 21 and 22, of a plate 48 let into the vertical stop of the sill against which the sash lies and having at its upper edge a slot 49 adapted to receive a shank of a headed screw 50 projecting from the inner surface of the bottom rail of the sash. Obviously by this, or equivalent means, the sash may be made perfectly secure, merely by closing, against any outward pressure such as a person sitting against it, and all danger of falling out eliminated.

In order to secure a tight joint between the opposite edges of a sash and its two carrier strips, I provide in the face of each carrier strip a groove 51, centrally and longitudinally disposed, and in which is secured an elastic tubular weather strip 52 the outer curved surface of which presses tightly against the sash, either flattened thereagainst or lying in a shallow groove thereof as shown in the drawings. Other parallel cuts 53, 54 may be made in the meeting faces of the carrier strip and sash stile, for diverting water entering the joint.

For the greater security of each carrier strip in its slideway, it is provided at its outer and inner edges with saw-slits 55, 55 adapted to receive the edges of strips 56, 57 of sheet metal secured to the outer casing 58 and inner stop 59 respectively, and the opposite arms of a T-shaped piece 60 whose upright portion is secured in the edge of the parting bead 4, all as shown more particularly and in detail in Fig. 9 of the drawings. These metal strips not only secure a tighter joint of the carrier strips with the window frame, but also aid in retaining said carrier strips in proper position as they slide vertically up and down.

If desired, I may place on the pulley stile 7 at the top or bottom, or both, of the stile of each sash, a leaf spring 61 as shown in detail in Figs. 19 and 20, and which is adapted to press against the carrier strips 5, 6 to force the same against the opposite edges of the sash.

Having thus described the invention, what I claim as new is:

1. In a window, the combination with a sash, abutting members for the opposite lateral edges of said sash, and pivots between said sash edges and abutting members, of holding plates secured flatwise upon the facing surfaces of said sash edges and abutting members concentric with said pivots, said plates having each an annular series of undulations and each individual undulation gradually decreasing in height radially inward toward the center of said series.

2. In a window, the combination with a sash, abutting members for the opposite lateral edges of said sash, and pivots between said sash edges and abutting members, of holding plates secured flatwise upon the facing surfaces of said sash edges and abutting members concentric with said pivots, said plates having each an annular series of undulations and each individual undulation gradually decreasing in height radially inward from a maximum at the peripheral edge of the plate to nothing.

3. In a window, the combination with a sash, abutting members for the opposite lateral edges of said sash, and pivots between said sash edges and abutting members, of holding plates secured flatwise upon the facing surfaces of said sash edges and abutting members concentric with said pivots, said plates having each an inner annular flat portion around said pivot and an outer annular series of undulations, each individual undulation gradually decreasing in height from its outer end longitudinally inward to the said flat central portion.

JOHN AUSTIN.

Witnesses:
RUSSELL M. EVERETT,
ETHEL B. REED.